Dec. 16, 1924.                                                    1,519,438
A. J. CHARLTON
COMBINED WATER GAUGE AND HEAT INDICATING DEVICE
Filed May 20, 1922
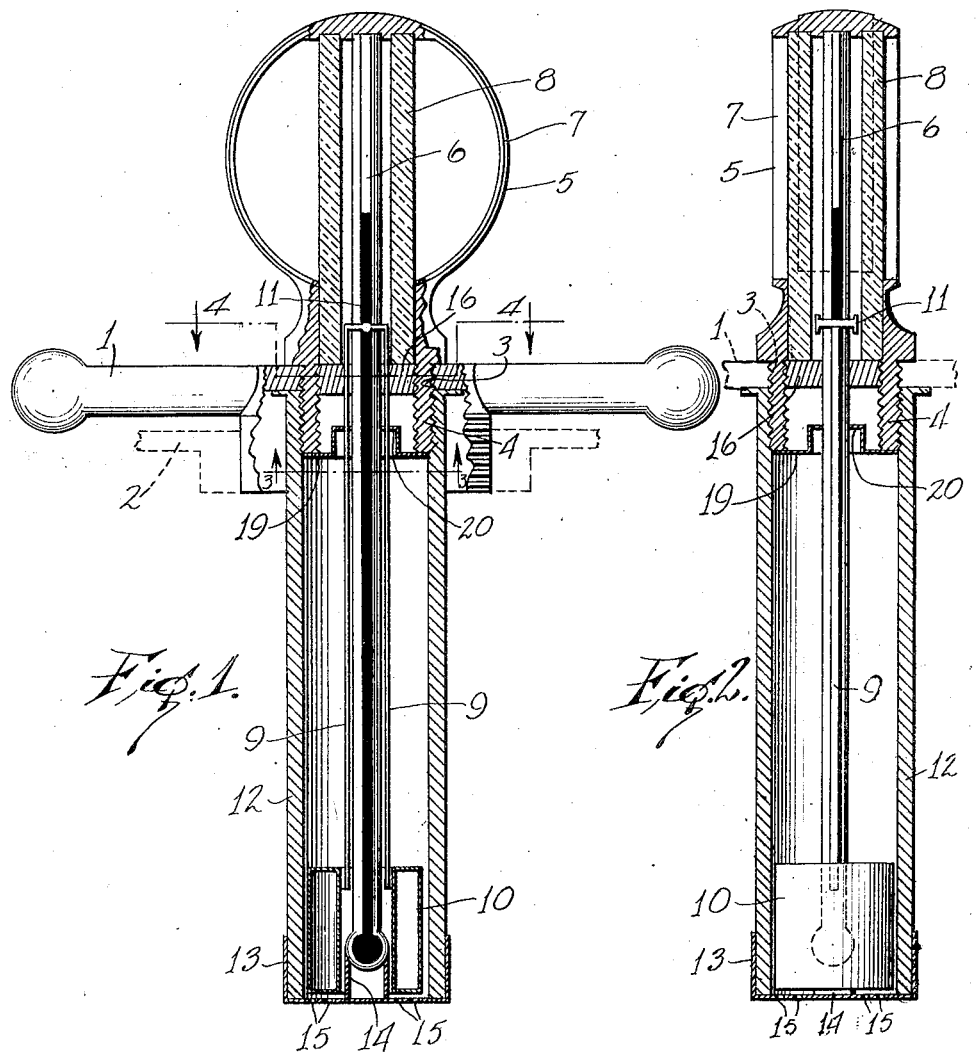
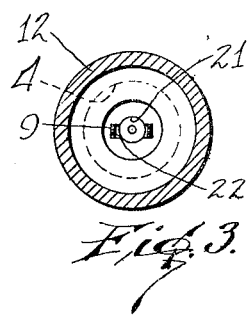
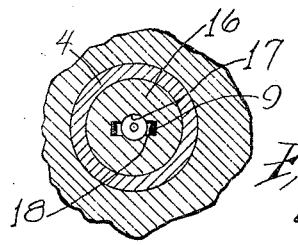
INVENTOR
A. J. Charlton
BY
ATTORNEYS Patented Dec. 16, 1924.

1,519,438

UNITED STATES PATENT OFFICE.

ALBERT JOHN CHARLTON, OF LOWDEN, IOWA.

COMBINED WATER GAUGE AND HEAT-INDICATING DEVICE.

Application filed May 20, 1922. Serial No. 562,349.

*To all whom it may concern:*

Be it known that I, ALBERT JOHN CHARLTON, a citizen of the United States, and a resident of Lowden, in the county of Cedar and State of Iowa, have invented a new and useful Improvement in Combined Water Gauges and Heat-Indicating Devices, of which the following is a full, clear, and exact description.

My invention relates to improvements in combined water gauge and heat indicating device, and it consists in the combinations, constructions and arrangements herein described and claimed:

An object of my invention is to provide a combined water gauge and heat indicating device, which may be readily attached to the radiator cap of an ordinary automobile.

A further object of my invention is to provide a device of the character described which has novel and efficient means for indicating the amount of water within the radiator.

A further object of my invention is to provide a device of the character described which consists of relatively few parts and which can be manufactured cheaply.

Other objects and advantages will appear in the following specification, and the novel features of the invention will be particularly pointed out in the appended claim.

My invention is illustrated in the accompanying drawings, forming part of this application, in which—

Fig. 1 is a vertical section through the device, as shown operatively applied to a radiator cap, Fig. 2 is a vertical section taken at right angles to the view shown in Fig. 1, Fig. 3 is a section along the line 3—3 of Fig. 1, and Fig. 4 is a section along the line 4—4 of Fig. 1.

In carrying out my invention, I dispose a radiator cap 1 in the inlet of a radiator 2 indicated by the dotted lines in Fig. 1. The cap 1 has an opening 3 therein, which is adapted to receive the threaded shank 4 of a heat indicating device indicated generally at 5. It will be noted from Figures 1 and 2 that the heat indicating device carries a thermometer 6 which depends below the cap 1 and is provided with the usual bulb 7 at its lower end. The heat indicating device has a metal ring 7 which is carried by the shank 4 and which encloses a tubular glass 8, the glass being disposed around the upper end of the thermometer 6 whereby the portion of the thermometer which is disposed within the ring 7 is protected.

The thermometer 6 also acts as a guide for the water indicator arm 9. The arm 9 comprises 2 strips which are secured to a float 10 at their lower end and which have an indicating marker 11 at their upper end. The marker 11 is in reality a loop which surrounds the thermometer 6 which is carried by the arm 9. The float 10 and the thermometer 6 are enclosed in a depending casing 12. The casing 12 is screwed onto the lower end of the shank 4 and bears against the inner side of the cap 1. In this manner, the casing 12 acts as a locking nut to the heat indicating device and at the same time protects the thermometer and the float. A cap 13 is disposed on the lower end of the casing 12 and has a tubular central portion 14, which supports the bulb 7. As clearly shown in Fig. 1, the float is cylindrical shaped and surrounds the thermometer 6. The bottom of the cap 13 is perforated, as at 15, so as to permit the water to enter the casing 12 and to actuate the float 10, whereupon the arm 9 and the indicator 11 will be moved.

In Figures 3 and 4, I have shown the means by which the upper end of the thermometer 6 and the arm 9 are held. A plug 16 is screwed into the hollow shank 4 and has an opening 17 (see Fig. 4), which is adapted to snugly receive the thermometer 6. It will also be noted from Fig. 4 that the opening 17 has recesses 18 which act as guiding means for the arm 9. In this manner, the thermometer 6 is prevented from vibrating and at the same time permits free movement of the arm 9.

An additional guiding means for the arm 9 is clearly shown in Figures 1, 2 and 3. This means comprises a disk 19 which has an upwardly extending cylindrical portion 20 that is adapted to receive the thermometer 6 and the arm 9. This disk has an opening 21 and recesses 22 which are identical with the opening 17 and the recesses 18 in the plug 16. In this manner, the plug and the disk act as guiding means for the thermometer and the disk.

From the foregoing description of the various parts of the device, the operation thereof may be readily understood. When the heat indicating device 5 and the casing 12 are assembled with the cap 1, they provide a single unit with respect to the cap and are removed when the cap is removed. The cap is secured to the radiator 2 in the ordinary manner and when disposed in place, causes the casing 12 to depend a relatively great distance within the radiator, whereby the lower end of the casing is submerged in the water. By providing the cap 13 with perforations, the splashing of the water in the radiator due to the car moving over uneven ground, does not affect the movement of the float. The water within the casing 12 is practically stationary and has very little movement. It is obvious that if the water rises within the casing 12, it will move the float 10 upwardly and thus cause the pointer 11 to indicate a greater quantity of water within the radiator. The thermometer 6 acts as a guide to the float 10 as the latter is moved by the water.

The device also acts as an ordinary heat indicating device, since the thermometer is sensitive to slight variations in the temperature of the water within the radiator. A change in temperature will cause the mercury within the thermometer to rise or lower and to thus indicate the temperature of the water within the radiator. The pointer 11 and the thermometer 6 are disposed adjacent to each other and both may be read at a single glance. It will therefore be observed that the device comprises a compact, efficient and useful means, by which the volume of water within the radiator is instantly ascertained and in which the temperature is also readily readable. As heretofore stated, the device consists of a minimum number of parts and may be readily and quickly applied to an ordinary radiator cap in place of the heat indicating device now in use. The device is simple in construction and can be manufactured cheaply.

I claim:

A device of the type described comprising a radiator cap, a thermometer extending above and below said cap and being carried thereby, a transparent protecting tube adapted to enclose the portion of the thermometer extending above said cap, a float slidably carried by said thermometer at the lower end thereof, and having an indicating pointer extending above said cap and being slidably disposed between said tube and said thermometer and means for securing said tube in place said means acting as a guide for the pointer.

ALBERT JOHN CHARLTON.